United States Patent [19]

Wegrzynowicz

[11] Patent Number: 5,136,636
[45] Date of Patent: Aug. 4, 1992

[54] TELEPHONE CONNECTION TO A NEARBY DEALER

[75] Inventor: Carol A. Wegrzynowicz, Holmdel, N.J.

[73] Assignee: AT&T Bell Laboratories, Murray Hill, N.J.

[21] Appl. No.: 652,162

[22] Filed: Feb. 7, 1991

[51] Int. Cl.⁵ .................. H04M 3/50; H04M 7/00; H04Q 3/72

[52] U.S. Cl. ................................. 379/207; 379/97; 379/127; 379/201

[58] Field of Search .......... 379/97, 112, 113, 114, 379/115, 127, 201, 207, 211

[56] References Cited

U.S. PATENT DOCUMENTS

| | | | |
|---|---|---|---|
| 4,191,860 | 3/1980 | Weber | 379/115 |
| 4,757,267 | 7/1988 | Riskin | 379/113 |
| 4,797,818 | 1/1989 | Cotter | 364/401 |
| 4,924,510 | 5/1990 | Le | 379/221 |

*Primary Examiner*—Thomas W. Brown
*Attorney, Agent, or Firm*—Werner Ulrich

[57] ABSTRACT

This invention relates to an arrangement for selecting a local dealer out of a large group of dealers for completion of an 800 number. The caller is first connected to a toll switching system. That system sends a query to a first database using the 800 number and the caller's Numbering Plan Area (NPA) code. The first database responds with a routing number which is used to route a second query to one of a plurality of second databases. The second query uses the routing number and the caller's NPA plus office code to access the second database and to obtain the telephone number of a local dealer. The telephone number is returned to the toll system for completing the call. Advantageously, a caller can use a number advertised on national television to access a local dealer.

20 Claims, 3 Drawing Sheets

TELEPHONE CONNECTION TO A NEARBY DEALER

TECHNICAL FIELD

This invention relates to methods and apparatus for completing calls to one of a plurality of destinations all identified by the dialing of a common telephone number.

PROBLEM

In recent years, a large number of businesses have developed of a type wherein each business has a large number of establishments all providing a common service and or product line. A typical example is a nationally franchised pizza chain which provides both take out and eating facilities. Such nation-wide chains would like to take advantage of national advertising media, such as network television, to attract customers and to advertise using a single telephone number that any of the customers can call to reach a local member of the business chain.

A similar problem has been faced and solved in accordance with the teachings of R. P. Weber, U.S. Pat. No. 4,191,860 (Weber). The Weber invention is useful for accessing for example one of a number of reservation offices of a national airline using a common telephone number. The common telephone number is frequently an 800 number which allows such calls to be made free of charged to the customer. According to the teachings of Weber, a caller dials an 800 number which together with the numbering plan area code (NPA, the first three digits of the caller's 10-digit number) is used along with the 800 number dialed by the caller to access a translation table stored in a database system which translation table provides a POTS (Plain Old Telephone Service) number to which the call is routed. Since the translation table is accessed using both the dialed 800 number and the caller's NPA, callers from different NPAs may be routed to different reservations offices. Furthermore, the use of the translation permits out-of-hours traffic to be routed to a different set of reservation offices than busy hour traffic.

Another arrangement disclosed in U.S. Pat. No. 4,757,267 by B. Riskin provides that a call is routed to a nearby dealer by first being routed to a service company which finds the coordinates, the location of the callers local central office, and calculates which of the dealer locations are close to that central office. The service company then sets up a call to that dealer. Such an arrangement is uneconomical because it requires that two separate connections be established, the first to the service company, and the second to the dealer. Riskin shows an alternative arrangement wherein the database system of Weber accesses another database which contains translation information for finding the POTS number of a dealer nearby to the caller. That auxiliary database then returns the POTS number to the 800 number database which in turn reports the POTS number to the toll office which made the original inquiry. Such an arrangement has a number of problems. While the arrangement has not been implemented, it is expected that use of such an arrangement is likely to exceed the target time allotted to the translation operation thereby causing excessive delay to the caller. Further, with present technology such an arrangement is limited in throughout to a calling rate significantly below that demanded by the larger customers for such service, and represents a potential network bottleneck in case of sudden large load to a customer. Moreover, the alternative arrangement is not permitted under present long distance carrier tariffs.

The arrangements of the Weber patent are satisfactory when only a small number of alternate destinations are involved and where the NPA is an adequate source of the information needed to distinguish which callers should be routed to which reservation system. The basic Weber arrangement has been augmented for the purposes of providing software defined networks and direct services dial capabilities through auxiliary databases which are accessed following the access of a primary Weber type database, for example, an INWATS database, which, when a secondary database needs to be accessed provides a key for performing the latter access. However, even with the provision of secondary databases, the problem of reaching a local pizza establishment from one of more than approximately 10,000 6-digit codes is not solved because these databases are too small to provide information for selecting a local dealer even based on six or let along ten digits of the caller's telephone number, and further lack the capacity to handle the type of call volume that may be expected to a large pizza chain. Accordingly, there is no satisfactory arrangement for selecting a local dealer of a company specified by a nation-wide number and making such a selected based on the first six or ten digits of the caller's telephone number.

SOLUTION

The above problem is solved and an advance is made over the prior art in accordance with the principles of this invention wherein, in a departure from the prior art, a plurality of second databases serve a customer and wherein the primary database provides information for selecting which of that plurality of second databases is to be accessed for performing the translation for the customer between the caller's partial or complete directory number and a number for accessing a selected destination, for example, a local dealer, for serving that caller. Advantageously, such an arrangement is open ended and permits an essentially unlimited amount of data to be provided for making the translation.

In accordance with an illustrative embodiment of applicant's invention, a primary database is accessed using the caller's NPA and the directory number for identifying the customer; the output of the primary database is a number for identifying the secondary database, a Direct Services Dialing (DSD) database, and for providing an access key to access that secondary database. The access key identifies the customer. This access key plus the first six digits (NPA+3-digit office code) of the caller's directory number or the entire number is then used to locate the translation information, in the identified secondary database, necessary to identify a local dealer for serving the caller.

In accordance with another aspect of the invention, for cases in which a plurality of dealers can conveniently serve the customer of a single office code and where the customer chooses not to provide full 10-digit translation for that area, the customer can choose to allocate a specific fraction to the callers to each of the dealers. Different percentages might be advantageous where one dealer can only service a particular office code whereas another dealer can serve two or more office codes. Advantageously, such an arrangement gives the customer the control over the allocation of calls to each dealer. The database can also be arranged to equalize traffic to each dealer and/or route callers from dealers whose incoming lines are busy to dealers whose incoming lines are available.

In accordance with one feature of the invention, the customer can update his own databases directly. In accordance with prior art practice, a customer is provided with an 800 number which is used to access the customer's database for modification. After the customer dials the database with a 800 number, the customer is routed to an Originating Screening Office/Action Point (OSO/ACP) when the customer logs in. The customer specifies an NPA code for which the customer wishes to modify the database. The OSO/ACP queries the INWATS database to identify the particular DSD database that contains translation information for that customer and that NPA code. The customer is then routed to that database and enters changes. After completion of changes for that NPA, the customer is returned to the OSO/ACP where the customer can enter another NPA code. Alternatively, a small database can be provided at the OSO/ACP to translate directly from the customer identification (the dialed 800 number) and the specified NPA code to the identity of the DSD database. Even if this feature is provided for some customers, others may have their database modified by the common carrier. The customer submits a request for a work order to begin the process.

others may have their database modified by the common carrier. The customer submits a request for a work to begin the process.

If nationwide 7-digit numbers (for example, numbers beginning with 950) can be allocated for a limited number of dealers, than this service can also be provided as an Intra Local Access and Telephone Transport Area (Intra-LATA) call through a local carrier equipped to access databases such as an INWATS type database and a plurality of DSD databases. The databases may serve more than one local entity; the NPA code of the caller and the 950 code of the called party would be provided to the INWATS-type database, and the 950 code of the called party and six digits or the full 10-digit number of the caller would be supplied to the identified DSD database.

DETAILED DESCRIPTION

Figure 1:
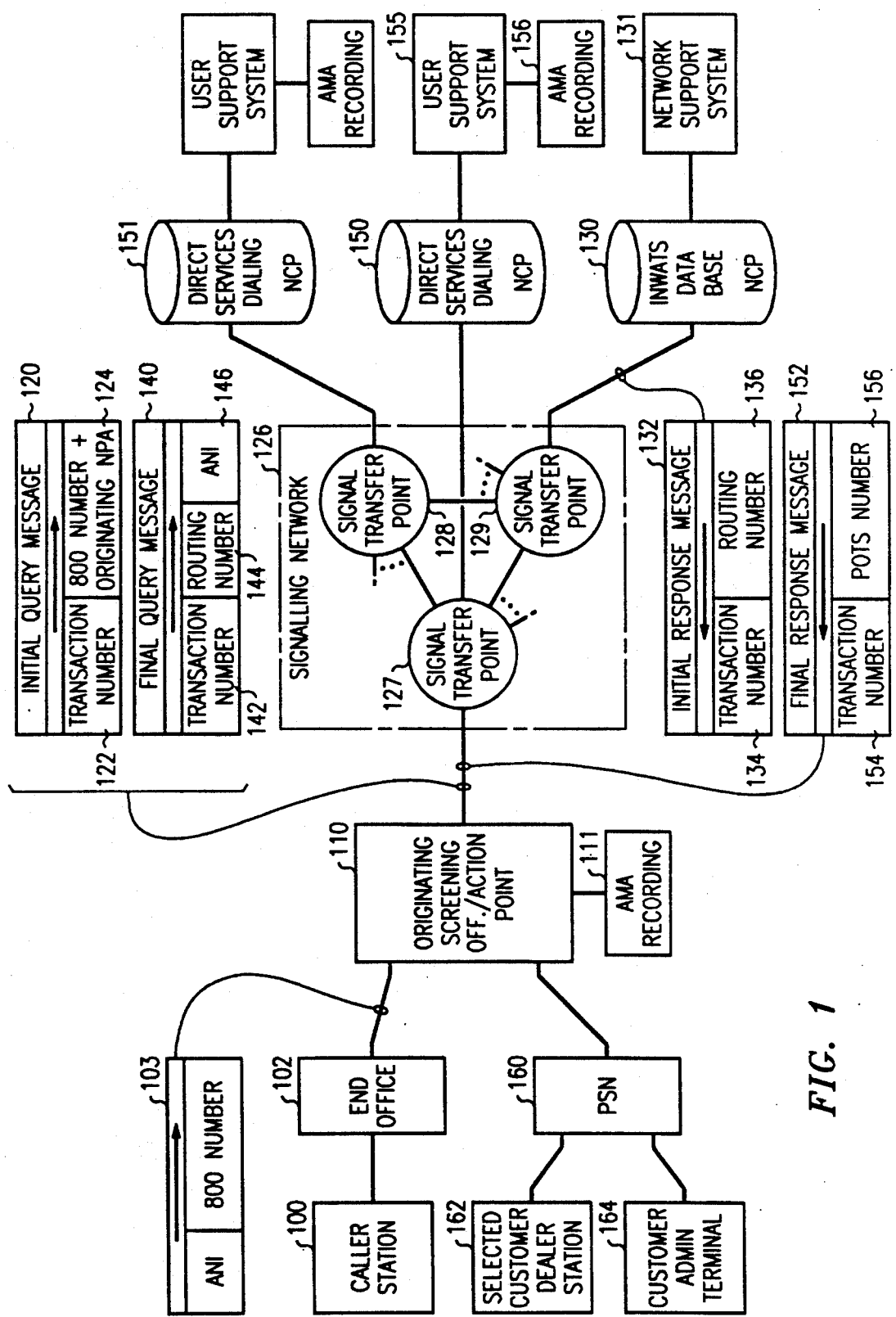
FIG. 1 is a block diagram of an illustrative embodiment of the invention.

FIG. 1 is a block diagram of an exemplary embodiment of the invention. A caller station 100 connected to an end office 102 dials an 800 number. The end office 102, on the basis of a translation performed therein, routes the call to an Originating Screening Office/Action Point (OSO/ACP) 110. Originating screening offices, action points and network control point (NCP) databases are well known in the art and are described, for example, in *The Bell System Technical Journal*, vol. 61, no. 7, part 3, pages 1573–1815 (September 1982). This invention utilizes an INWATS data NCP and a plurality of Direct Services Dialing (DSD) databases. The routing may be direct or may be through an access tandem and/or an access toll switch. The end office forwards to the OSO/ACP the caller's number as identified by automatic number identification (ANI) plus the 800 number dialed by the caller. The number identified by ANI is usually used for billing purposes the represents a billing number of the caller. In this case, the ANI is used for location information to determine which customer dealer is nearby to the caller. OSO/ACP 110 receives the call with an ANI number and the called 800 number and recognizes, because the called number is an 800 number, that an INWATS database (IDB) 130 must be consulted. OSO/ACP 110 sends an initial query message 120 to IDB 130. The initial query message 120 comprises a transaction number 122, the 800 number dialed by the caller station and the numbering plan area (NPA) code (i.e., the first three digits of a 10-digit number) 124 of the caller station as identified by the first three digits of the caller's ANI. The transaction number 122 is used to associate return messages with the proper call. This query message 120 is sent over signaling network 126 to IDB 130 where it is translated into a routing number.

IDB 130 translates the input from initial query message 120 to generate initial response message 132. Initial response message 132 is sent over signaling network 126, via signal transfer points 129 and 127, to OSO/ACP 110. Initial response message 132 includes the transaction number 134, so that the response message can be associated with the proper call in OSO/ACP 110, and a routing number 136. The routing number comprises a 3-digit prefix, which in the initial embodiment will be 195, followed by a 7-digit number that identifies the customer and the NPA of the caller. The prefix 195 which is a number that cannot be dialed as the first three digits of a called telephone number, is used by OSO/ACP 110 to identify the call as one requiring an additional translation. In the initial embodiment, the 7-digit number following the prefix 195 consists of four digits for identifying the customer, the four digits being in the first three and the last place of the 7-digit number and the fourth, fifth, and sixth position comprising the NPA of the caller. Additional information for identifying the customer is encoded in the second of the three NPA digits by taking advantage of the fact that, at least for the time being, an NPA must have zero or one for the second digit so that, for example, values from zero through four can be used within the same NPA to specify five different sets of customers if the middle digit of the NPA code is zero and values 5–9 can be used to specify five different sets of customers if the middle digit of the NPA is one. As NPA codes are introduced whose middle digit is not zero or one, the range of additional customer identification information contained in that middle digit will be reduced and other means will have to be found for specifying additional customer specification information. Such additional information can be sent in an expanded routing number or, if additional 19x codes are made available, in the additional 19x codes.

OSO/ACP 110 receives the initial response message 132 which has been transmitted through signaling network 126 to OSO/ACP 110 and recognizes, on the basis of the initial three digits of the routing number, that an additional data query must be made. OSO/ACP 110 sends a final query message 140 comprising the transaction number 142, the routing number 144, and the caller station ANI 146 to the signaling network 126. In that signaling network, the initial STP 127 which receives the final query message 140, makes a translation to identify which direct services dialing (DSD) database 150, . . . , 151 contains the translation information. An optimum arrangement would be one wherein, in most cases, the DSD database that contains the translation information would be connected directly to the STP that has received the message from the querying OSO/ACP. In this case, that would be DSD database 150. However, to handle a more general situation in which, for example, only two DSD databases are used for serving a particular customer, another database such as DSD database 151 would be accessed by sending the DSD query message 140 first to STP 127 and then to STP 128 for accessing the DSD database 151.

In this specific embodiment, STP 127 makes the translation from the routing number to identify which DSD database contains the appropriate translation. In alternative embodiments, OSO/ACP 110 makes this determination using its own translation tables and directs the message through the appropriate header to the correct STP for serving the selected DSD database.

Continuing with the basic description of the call under consideration, DSD database 150 receives the final query message 140. It uses the routing number to find a segment of its database that contains the required translation information. DSD database 150 translates the contents of that message into a POTS number of a dealer nearby to the caller station. In performing this translation DSD database 150 can take into account a busy state of the selected dealer to route to an alternate dealer, as described in Weber. Further, the customer may specify that a percentage of calls from a particular NPA-NXX be routed to a specific dealer, and another percentage to another dealer, and provide the POTS number accordingly. DSD database 150 then transmits a final response message 152 containing the transaction number 154, and the POTS number 156 of a selected nearby dealer. This final response message 152 is sent back from DSD database 150 via signaling network 126 and specifically via STP 127 to OSO/ACP 110 which uses the POTS number 156 to route the call through public switched network (PSN) 160 to selected customer dealer station 162. The path through the PSN 160 may be directly to an end office serving the selected customer dealer station 162 or the call may be routed via one or more toll and/or tandem switches to such an end office. Automatic Message Accounting (AMA) facilities 111,156 are provided to record calls at the OSO/ACP and the DSD NCP so that the customer may be billed and that the customer have data for billing individual dealers. The DSD NCPs have associated user support systems (155) for controlling the updating of the database, and for controlling the preparation of AMA records.

In order to control the change of data for a customer in a DSD NCP database, a customer administration terminal 164 is connected through PSN 160 to OSO/ACP 110 (or another OSO/ACP for serving that customer). The process is described further with respect to FIG. 3.

Figure 2:
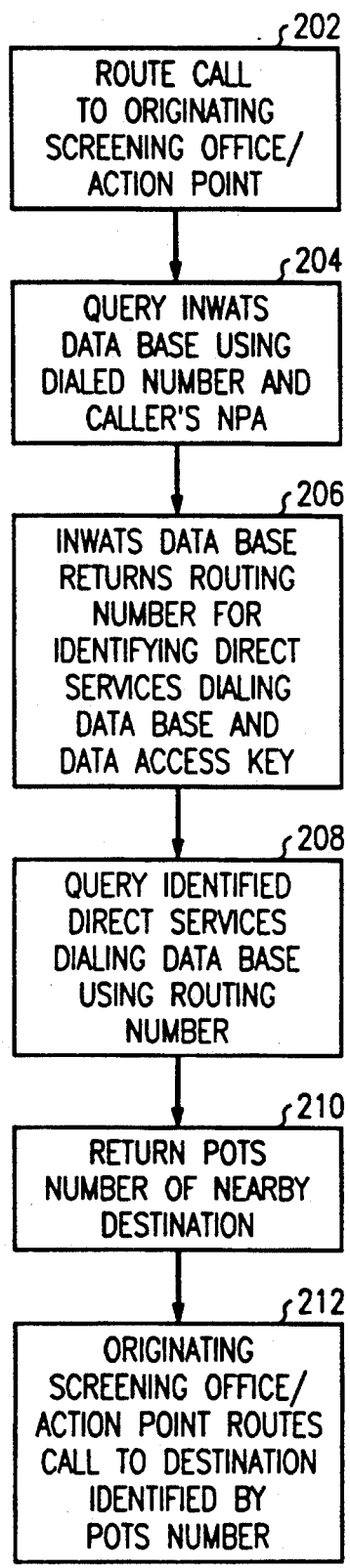
FIG. 2 is a flow diagram illustrating the process for routing a call to a nearby dealer.

FIG. 2 is a flow chart illustrating the processing of a call in accordance with the principles of this invention. The customer administration terminal 164 dials a special 800 number for accessing data for that customer. Block 202 shows that the call is routed to an OSO/ACP for processing this type of call. Such a switching system is equipped to query a database in order to obtain information for routing the call. The OSO/ACP queries the INWATS database using the dialed number and the caller's NPA code (action block 204). The INWATS database performs a translation and returns a routing number. In this case, the routing number identifies the particular direct services dialing database that contains the data that will be needed for routing the call and a data access key for accessing the data in that database. The OSO/ACP queries the identified direct services dialing database using the routing number to select the identified direct services dialing database (action block 208). The identified direct services dialing database makes the translation from the customer's number and the first six digits of the caller's number in order to find the POTS number of the nearby dealer destination and returns this POTS number to the OSO/ACP (action block 210). The OSO/ACP then routes the call to the nearby destination as identified by the POTS number (action block 212).

If nationwide 7-digit numbers (for example, numbers beginning with 950) can be allocated for a limited number of dealers, then this service can also be provided as an Intra Local Access and Telephone Transport Area (Intra-LATA) call through a local carrier equipped to access databases such as an INWATS type database and a plurality of DSD databases. The databases may serve more than one local entity; the NPA code of the caller and the 950 code of the called party would be provided to the INWATS-type database, and the 950 code of the called party and six digits or the full 10-digit number of the caller would be supplied to the identified DSD database.

Figure 3:
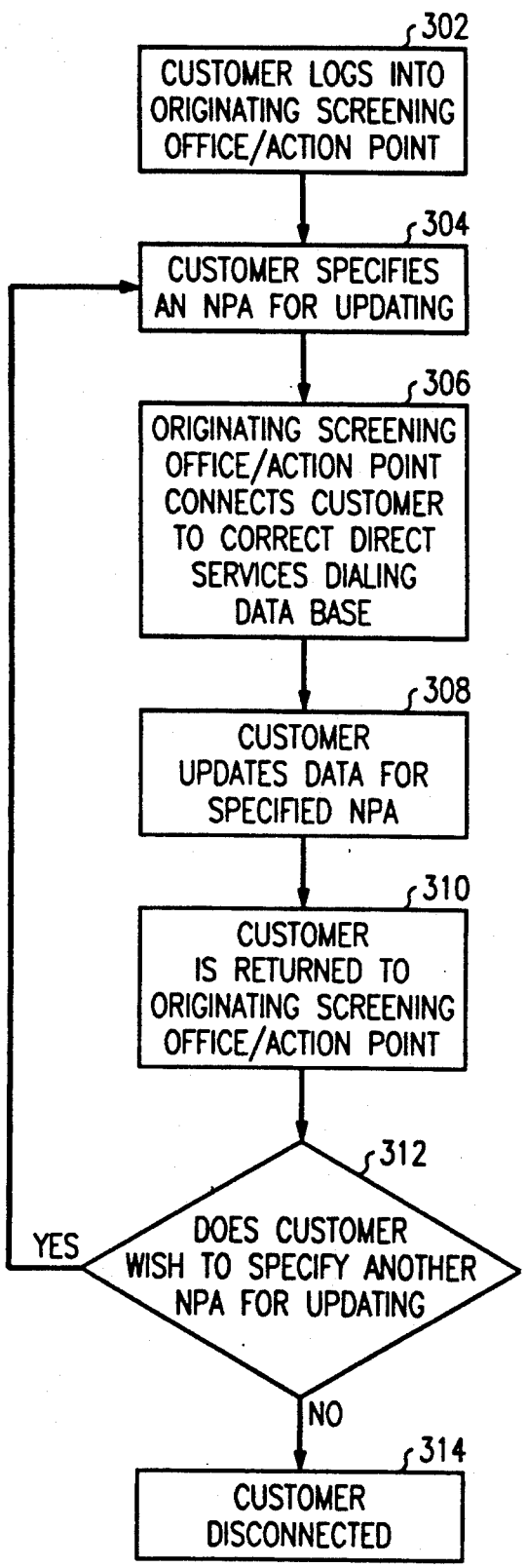
FIG. 3 is a flow diagram of a process for updating data for performing such routing.

FIG. 3 is a flow diagram of the actions performed by a customer to update records for that customer in the database. The customer makes a call by dialing an 800 number assigned to that customer from customer administration terminal 164 and logs into the OSO/ACP associated with that customer (action block 302). The customer specifies an NPA for updating (action block 304). The OSO/ACP then connects the customer to the DSD database which contains translations for that NPA for that customer (action block 306). The rest of the procedure is carried out under the control of a user. support system, such as 155 connected to DSD 150. Action block 306 can be carried out in a number of ways. The OSO/ACP may contain a small translation which specifies the DSD database for that customer and for all the NPAs of each customer associated with that OSO/ACP. The customer dials an 800 number specially designated for making changes to the DSD databases for that customer. The call can then be routed to that database. Alternately, the OSO/ACP can make a query of the INWATS database to retrieve the routing number for that customer and NPA and can use this routing number to route the customer to the DSD database that contains the translation information for that customer. A third alternative is to provide the customer with different 800 numbers for accessing each of the databases which contain data for that customer or to query the customer through prompts to provide the identification of the proper database. After the customer is connected to the correct DSD database, the customer provides information to that database for updating the data for the specified NPA (action block 308). After this information has been updated, the customer is returned to the OSO/ACP (action block 310) where he is prompted to reply whether or not another NPA is to be updated (test 312). If not, the customer is disconnected (action block 314). If so, the loop beginning with action block 304 is repeated. A fourth alternative is to use a single 800 number for several or all customer administrators, and to identify the customer as part of the log-on and following procedure.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of routing a call from a caller to a selected destination, wherein said destination is one of a plurality of destinations of one customer identified by a common telephone number, comprising:
    responsive to receipt of said common telephone number from said caller accessing a first database using said common telephone number and area information for said caller to obtain a routing key; and
    accessing a second database, out of a plurality of second databases for serving said one customer, to select a number for directing said call to said selected destination, said accessing performed using said routing key and at least a portion of a telephone number of said caller, said second database selected using said routing key.

2. The method of claim 1 wherein each of said plurality of second databases comprises an essentially disjunct set of translation data of said customer.

3. The method of claim 1 wherein said second database is populated to select a destination nearby to said caller.

4. The method of claim 1 wherein said area information comprises a numbering plan area code of said caller.

5. The method of claim 1 wherein said portion of a telephone number comprises a numbering plan area code and an office code of said caller.

6. The method of claim 5 wherein, for at least one instance of an area code plus an office code, said second database selects a number of one of at least two destinations.

7. The method of claim 6 wherein said second database selects among said at least two destinations by allocating a percentage of traffic to each of said at least two destinations.

8. The method of claim 6 wherein said second database selects among said at least two destinations by selecting an alternate destination if a first choice destination is busy or unavailable.

9. The method of claim 1 wherein said at least a portion of a telephone number comprises a complete telephone number of said caller.

10. The method of claim 1 wherein said second database is accessed via a data network.

11. The method of claim 10 wherein said data network comprises a signaling network comprising a signal transfer point.

12. The method of claim 10 wherein said signal transfer point uses said routing key to route a query message toward said second database for accessing data therein.

13. The method of claim 1 further comprising the steps of: accessing one of said plurality of second databases from a terminal of said customer for reading or modifying data for said customer in said one database.

14. The method of claim 13 wherein said accessing comprises:
    dialing an INWATS telephone number;
    specifying a numbering plan area for which said customer's data is to be accessed; and
    based on said INWATS number and said numbering plan area, routing said terminal to said one second database.

15. The method of claim 1 wherein ones of said plurality of second databases serve a plurality of customers.

16. The method of claim 1 wherein said common telephone number is an INWATS telephone number and said first database is an INWATS database.

17. The method of claim 1 further comprising the step of: prior to accessing said first database, routing said call to a switching system for accessing said first and second databases.

18. The method of claim 17 further comprising: further routing said call received in said switching system from said switching system toward said selected destination.

19. A method of routing a call from a caller to a selected destination, wherein said destination is one of a plurality of destinations of one customer identified by a common telephone number, comprising:
    responsive to receipt of said common telephone numbers from said caller accessing a first database using said common telephone number and a first portion of a telephone number for said caller to obtain a routine key; and
    accessing a second database, out of a plurality of second databases for serving said one customer, to select a number for directing said call to said selected destination, said accessing performed using said routing key and at least a second portion of said telephone number of said caller, said second database selected using said routing key.

20. The method of claim 19 wherein said customer has data in a group of first databases and a group of pluralities of second databases, each first database and each plurality of second databases for serving a different area or group of areas.

* * * * *

UNITED STATES PATENT AND TRADEMARK OFFICE
CERTIFICATE OF CORRECTION

PATENT NO. : 5,136,636

DATED : August 4, 1992

INVENTOR(S) : Carol A. Wegrzynowicz

It is certified that error appears in the above-identified patent and that said Letters Patent is hereby corrected as shown below:

Column 8, claim 19, line 39, delete "bers" and substitute --ber--.

Signed and Sealed this

Fifth Day of October, 1993

*Attest:*

BRUCE LEHMAN

*Attesting Officer*     Commissioner of Patents and Trademarks